United States Patent Office 3,497,517
Patented Feb. 24, 1970

3,497,517
1,3,4,9b-TETRAHYDRO-2H-INDENO[1,2-c]
PYRIDINES
Ernst Jucker, Ettingen, Anton Ebnother, Arlesheim, and
Jean-Michael Bastian, Brisfelden, Switzerland, assignors to Sandoz Ltd. (also known as Sandoz AG), Basel,
Switzerland
No Drawing. Continuation-in-part of application Ser. No.
647,306, June 20, 1967. This application Mar. 17, 1969,
Ser. No. 808,009
Claims priority, application Switzerland, Mar. 28, 1968,
4,617/68
Int. Cl. C07d 39/00; A61k 27/00
U.S. Cl. 260—293
23 Claims

ABSTRACT OF THE DISCLOSURE

The invention concerns acid addition salts of compounds of the formula:

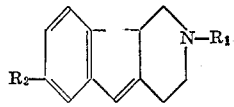

wherein $R_1$ is hydrogen, lower alkyl, alkneyl or alkinyl, benzyl or phenylethyl, and $R_2$ is hydrogen, chlorine or bromine or lower alkyl.

The compounds possess a wide spectrum of activity and are useful analgesics, psychotropics, blood-pressure lowering agents, and, particularly those compounds wherein $R_1$ is alkenyl or alkinyl, also anti-inflammatory agents.

The production of the compounds is furthermore described.

---

This is a continuation-in-part of our co-pending application Ser. No. 647,306, filed June 20, 1967. The invention concerns new heterocyclic compounds and a process for their production.

The invention provides acid addition salts of the new indenopyridine derivatives of Formula I,

    I wherein:
$R_1$ is hydrogen, lower alkyl, lower alkenyl, lower alkinyl, benzyl or phenylethyl, and
$R_2$ is hydrogen, chlorine, bromine or lower alkyl.

The compounds of Formula I have an asymmetric carbon atom and may therefore occur in optically active or in racemic form.

The present invention further provides a process for the production of acid addition salts of compounds of Formula I, characterized in that water is removed from a hydroxy compound of Formula II,

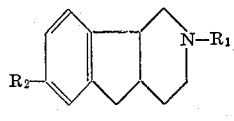    II wherein $R_1$ and $R_2$ have the above significance, by treating with a strong acid.

Acid addition salts of indenopyridine derivatives of Formula I, wherein the nitrogen atom is substituted by lower alkyl, lower alkenyl, lower alkinyl, benzyl or phenylethyl, and $R_2$ has the above significance, may also be prepared by treating with a halide of a strong acid, such as thionyl chloride.

Examples of starting materials of Formula II which may be used are 2-methyl-1,2,3,4,4a,9b-hexahydro-5H-indeno[1,2-c]pyridin-5-ol, 1,2,3,4,4a,9b - hexahydro - 5H-indeno[1,2-c]pyridin-5-ol, 7-chloro-2-methyl - 1,2,3,4,4a,9b-hexahydro-5H-indeno[1,2-c]pyridin-5-ol, and 2-isopropyl - 1,2,3,4,4a,9b - hexahydro - 5H - indeno[1,2-c]pyridin-5-ol. The final products of Formula I are stable in the form of their acid addition salts. In the form of free bases, however, a rearrangement occurs with a shifting of the double bond. Strong acids which form crystalline salts with compounds I are thus preferably used for the splitting off of water. Examples of suitable acids are hydrochloric, hydrobromic, sulphuric, nitric, phosphoric, methanesulphonic, benzenesulphonic, and naphthalene-1,5-disulphonic acid. When optically active compounds of Formula II are used as starting materials, optically active final products I are obtained.

The above mentioned process involving treatment with a strong acid may, for example, be effected as follows:
A hydroxy compound of Formula II—as free base or in the form of an acid addition salt, e.g. as hydrochloride—is heated to the boil at reflux for about ½ an hour in an aqueous mineral acid, e.g. 2 N hydrochloric acid or a mixture of concentrated hydrochloric acid and water (e.g. 3:1 or 2:1). The resulting acid addition salt, e.g. the hydrochloride, of compound I usually precipitates in crystalline form during the heating or upon cooling the reaction mixture, e.g. to 0° C., and is filtered off. When no crystallization occurs the reaction solution is concentrated by evaporation until crystallization commences, or to dryness. The crude product which is filtered off or obtained as residue may be purified in manner known per se, e.g. by crystallization from suitable solvents, e.g. methanol, ethanol, isopropanol, ethanol/ether, water and dilute aqueous hydrochloric acid. The removal of water may also be effected in analogous manner with organic sulphonic acids, e.g. naphthalene-1,5-disulphonic acid.

The above mentioned process involving treatment with a halide of a strong acid may, for example, be effected as follows:
A compound of general Formula II, wherein the nitrogen atom is substituted by lower alkyl, alkenyl, alkinyl, benzyl or phenylethyl, and $R_2$ has the above significance, is dissolved in a chlorinated hydrocarbon, such as chloroform, thionyl chloride is added to the solution and this is heated to the boil for a short time. The residue obtained after evaporating the solvent is digested with water at an elevated temperature, e.g. at 75° C., after cooling the resulting product is filtered off and purified by recrystallization, e.g. from a lower alcohol such as ethanol.

In the above compounds of general Formulae I and II, the $R_1$ significance includes lower alkyl which preferably has 1 to 8 carbon atoms, especially the methyl or ethyl radical, lower alkenyl or alkinyl radical which preferably has 2 to 8, especially 3 to 5 carbon atoms, and the lower alkyl significance for $R_2$ preferably has 1 to 4 carbon atoms, especially the methyl radical.

Hydroxy compounds of Formula II, which together with the processes for their production also form part of the present invention, may be produced as follows:
(a) Hydroxy compounds of Formula II may be produced by reducing a ketone of Formula III,

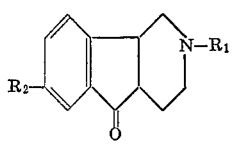    III in which $R_1$ and $R_2$ have the above significance, with a complex hydride of an alkali metal in a suitable solvent.

(b) Hydroxy compounds having the Formula IIa,

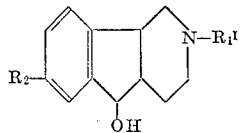

in which $R_1^I$ signifies a hydrogen atom, a lower alkyl or the phenylethyl radical, and $R_2$ has the above significance; may be produced by catalytic hydrogenation of a ketone having the Formula III.

(c) Hydroxy compounds having the Formula IIb,

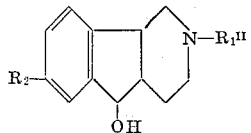

in which $R_1^{II}$ signifies a lower alkyl, alkenyl or alkinyl radical, the benzyl or the phenylethyl radical, and $R_2$ has the above significance; may be produced by reacting compounds of Formula IIc,

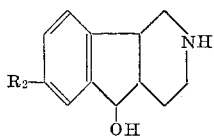

in which $R_2$ has the above significance; with a compound of Formula IV, $$R_1^{II}-X \qquad IV$$

in which $R_1^{II}$ has the above significance, and X signifies the acid radical of a reactive ester; in the presence of an acid binding agent.

(d) Hydroxy compounds having the Formula IId,

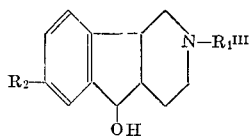

in which $R_1^{III}$ signifies a lower alkyl radical having at least two hydrogen atoms on the carbon atom joined to the nitrogen atom, the benzyl or the phenylethyl radical, and $R_2$ has the above significance; may be produced by reducing a compound of Formula V or VI,

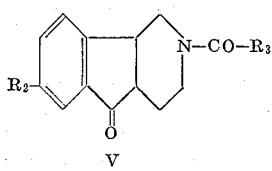 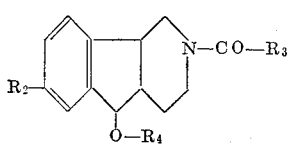

in which $R_2$ has the above significance, $R_3$ signifies a lower alkyl or alkoxy radical, the phenyl or the benzyl radical, and $R_4$ signifies a hydrogen atom or a radical of the formula —CO—$R_3$, in which $R_3$ has the above significance; with lithium aluminium hydride in an inert organic solvent.

(e) Hydroxy compounds having the Formula IIe,

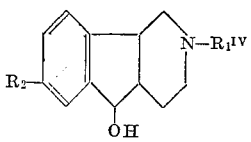

in which $R_1^{IV}$ signifies hydrogen or a lower alkyl radical having at least two carbon atoms, and $R_2$ has the above significance; may be produced by catalytic hydrogenation of a compound of Formula IIf,

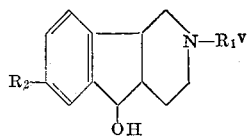

in which $R_1^V$ signifies the benzyl radical or a lower alkenyl or alkinyl radical, and $R_2$ has the above significance.

Any resulting mixtures of isomers may be separated into their individual racemates in manner known per se; these may also be split into their optically active components, e.g., by fractional crystallization of salts with optically active acids, e.g., di-p-toluene-d (or 1)-tartaric acid.

The production of the hydroxy compounds II may, for example, be effected as follows:

(a) In accordance with embodiment (a) of the process, the reduction of the ketones III is effected with lithium aluminium hydride in an anhydrous organic solvent which is inert under the reaction conditions, e.g., tetrahydrofuran and dioxane, or sodium borohydride in a suitable solvent, e.g., ethanol and ethanol/water.

(b) In accordance with embodiment (b) of the process, gaseous hydrogen in the presence of a hydrogenation catalyst, e.g., platinum, palladium, Raney nickel, is used as reducing agent, whereby the oxy radical is converted into the hydroxy radical with the simultaneous splitting off of any benzyl radical which may be present, or reduction of any alkenyl or alkinyl radicals which may be present to the corresponding alkyl radicals. Suitable solvents for the catalytic hydrogenation are, for example, lower alkanols, e.g., ethanol.

(c) In Formula IV, X signifies the acid radical of a reactive ester, preferably chlorine, bromine, iodine or a methane-, benzene- or p-toluene-sulphonyloxy radical. The reaction of a compound of Formulas IIc and IV, e.g., 1,2,3,4,4a,9b-hexahydro-5H-indeno[1,2-c]-pyridin-5-ol and isopropyl iodide, allyl bromide, 2-propinyl bromide and 2-phenylethyl bromide, is effected in the presence of an acid binding agent, e.g., potassium carbonate or triethylamine, in a suitable organic solvent, e.g., ethanol, chloroform, xylene, preferably at the boil at reflux, and for about 15 to 25 hours.

(d) The reduction of a compound of Formulas V and VI is effected with lithium aluminium hydride in an organic solvent which is inert under the reaction conditions, e.g. absolute tetrahydrofuran, whereby reduction of the N-alkoxycarbonyl radical to the methyl radical or of the N-acyl radical to the corresponding alkyl or aralkyl radical and, in the same step, reduction of the keto radical (Formula V) or reductive splitting off of any O-acyl or O-alkoxycarbonyl radical (Formula VI) which may be present, occurs.

(e) The catalytic hydrogenation of a compound of Formula IIf results in the benzyl radical being split off, or any alkenyl or alkinyl radical being reduced to the corresponding alkyl radical. 2-benzyl-1,2,3,4,4a,9b-hexahydro-5H-indeno[1,2-c]pyridin-5-ol may, for example, be used as starting material and this compound in a suitable solvent, e.g. ethanol/hydrochloric acid, is shaken with gaseous hydrogen in the presence of a hydrogenation catalyst, e.g. palladium, at room temperature and normal pressure.

The hydroxy compounds of Formula II obtained by the process described above may be isolated in manner known per se as free bases or in the form of their salts and purified in manner known per se, e.g. by crystallization from suitable solvents, e.g. ethanol, isopropanol, acetone and hexane.

Optically active compounds of Formula II may be obtained by reacting the corresponding racemic compound with an optically active acid, e.g. di-p-tolyl-d-tartaric acid.

The compounds produced may be separated by fractional crystallization, and the free bases may be liberated by means of an alkali.

The starting materials required for producing the compounds of Formula II may be produced as follows:

Lower alkyl esters of isonicotinic acid are reacted with compounds of Formula IVa,

in which $R_1^{II}$ has the above significance, and $X^I$ signifies bromine or iodine; to give the corresponding 4-alkoxycarbonyl-1-$R_1^{II}$ pyridinium halides, for example by heating the components for several hours in ethanol. Reaction of the so-obtained halides with sodium borohydride yields tetrahydroisonicotinic acid esters of Formula VII,

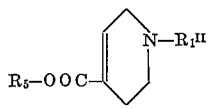

in which $R_1^{II}$ has the above significance, and $R_5$ signifies a lower alkyl radical; these are reacted with magnesium compounds of Formula VIII,

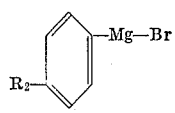

in which $R_2$ has the above significance; and the resulting products are hydrolized to give compounds of Formula IX,

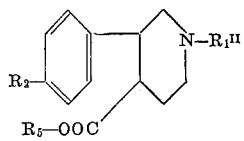

in which $R_1^{II}$, $R_2$ and $R_5$ have the above significance.

Ketones of Formula IIIa,

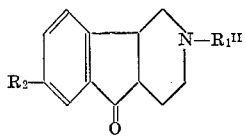

in which $R_1^{II}$ and $R_2$ have the above significance, are obtained from compounds of Formula IX, either by heating with polyphosphoric acid or by hydrolysis to the free carboxylic acids, production of the acid chlorides, e.g. with thionyl chloride, and treatment of the latter with anhydrous aluminium chloride. Ketones of Formula IIIb,

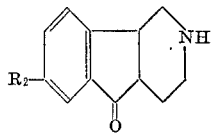

in which $R_2$ has the above significance; which are unsubstituted on the nitrogen atom, are obtained from compounds of Formula IIIc,

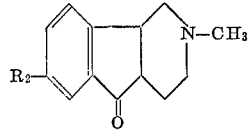

in which $R_2$ has the above significance, by heating with a lower alkyl ester of chloroformic acid and subsequent hydrolysis of the resulting urethanes of Formula Va,

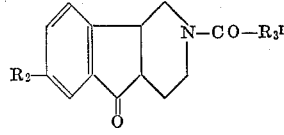

in which $R_2$ has the above significance, and $R_3^I$ signifies a lower alkoxy radical, e.g. with hydrochloric acid.

Compounds of Formula IIc are obtained by reduction of ketones of Formula IIId,

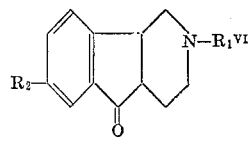

in which $R_2$ has the above significance, and $R_1^{VI}$ signifies hydrogen or a benzyl radical; in the latter case catalytically activated hydrogen is preferably used, otherwise the benzyl radical is subsequently split off hydrogenolytically.

Compounds of Formula V or VI are obtained by respective reaction of compounds of Formula IIIb or IIc with acetic acid anhydride or with compounds of formula Cl—CO—$R_3$, in which $R_3$ has the above significance, in the presence of an acid binding agent, e.g. pyridine. From the compounds IIc, mixtures of N—CO—$R_3$ derivatives and O,N-bis(—CO—$R_3$) derivatives may result. When the reduction of compounds of Formula VI with lithium aluminium hydride [see (d) above] is effected, any O-acyl or O-alkoxycarbonyl radical which may be present, is split off reductively, so that separation of such mixtures is not necessary. Such O-acyl or O-alkoxycarbonyl radicals may, however, also be split off hydrolytically before the reduction, e.g. by heating for 10 to 15 minutes with a solution of potassium hydroxide in a lower alkanol.

Compound IIf are obtained either by reduction of the corresponding ketones of Formula IIIe,

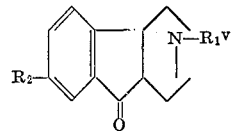

in which $R_1^V$ and $R_2$ have the above significance; with sodium borohydride or lithium aluminium hydride, or by reaction of compounds of Formula IIc with compounds of Formula IVb,

in which $R_1^V$ and X have the above significance; in the presence of an acid binding agent.

The acid addition salts of the compounds of Formula I are useful because they possess pharmacological activity in animals. In particular, the compounds are useful analgesics as indicated in the PBC (phenylbenzoquinone) writhing test and hot plate test, both carried out on mice. The compounds are furthermore useful psychotropic agents as indicated in the reserpine hypothermia and amphetamine hyperthermia tests in mice, and the ptosis and catalepsy tetrabenazine tests in rats. Additionally, the compounds exhibit a blood-pressure lowering activity in hypertonic animals (Grollman rats), without significantly affecting the blood-pressure of normotonic animals. The acid addition salts of the compounds of Formula I, in which $R_1$ is alkenyl or alkinyl, particularly 2-(2-butinyl)-1,3,4,9b-tetrahydro-2H-indeno[1,2-c]pyridine and 2-(3-butinyl) - 1,3,4,9b - tetrahydro - 2H - indeno[1,2 - c]pyridine, are also particularly useful as anti-inflammatory agents as is indicated in the traumatic edema and cotton pellet tests in rats, and the UV erythema test in mice.

The dosage administered will, of course, vary depending on circumstances such as the compound employed, mode of administration and the particular use as mentioned above. However, in general satisfactory results are obtained in each circumstance at a daily dosage of from about 0.015 milligram to about 1.5 milligrams per kilogram animal body weight, preferably given in divided doses 1 to 4 times a day, or in sustained release form. For the larger mammals, the total daily dosage is in the range of from about 1 milligram to about 100 milligrams, and dosage forms suitable for oral administration comprise from about 0.25 milligram to about 100 milligrams, preferably about 20 milligrams, of the active compound admixed with a solid or liquid pharmaceutical carrier or diluent.

The acid addition salts of the compounds of Formula I may be used as pharmaceuticals on their own or in the form of suitable medicinal preparations, e.g. tablets, dragées, injectable solutions, suppositories, for administration, e.g. enterally or parenterally. Aside from the usual inorganic and organic, physiologically inert adjuvants, e.g. lactose, starch, talcum, stearic acid, water, alcohols, glycerin, natural or hardened oils and waxes, the preparations may also contain suitable preserving, stabilizing or wetting agents, solubilizers, sweetening or colouring substances, and flavourings.

The term "in manner known per se" as used herein designates methods in use or described in the literature on the subject.

In the following non-limitative examples, all temperatures are indicated in degrees centigrade and are uncorrected.

In this specification, the term "acid addition salt" designates an acid addition salt which would be pharmacologically acceptable at the dosages indicated.

EXAMPLE 1

2-methyl-1,3,4,9b-tetrahydro-2H-indeno[1,2-c]pyridine 20.0 g. of 2-methyl-1,2,3,4,4a,9b-hexahydro-5H-indeno[1,2-c]pyridin-5-ol are heated to the boil at reflux with 200 cc. of 2 N hydrochloric acid for 20 minutes. The reaction mixture is then cooled to 0° and the precipitated hydrochloride of the compound indicated in the heading is filtered off, is dried in an exsiccator and recrystallized from methanol. M.P. 250–260° (decomp.).

The 2-methyl - 1,2,3,4,4a,9b - hexahydro-5H-indeno[1, 2-c]pyridin-5-ol used as starting material may be obtained by one of the methods described below:

(I) A solution of 20.0 g. of 2-methyl-1,2,3,4,4a,9b-hexahydro-5H-indeno[1,2-c]pyridin-5-one in 150 cc. of ethanol is shaken at 60° and 6 atmospheres of pressure with hydrogen and 0.5 g. of platinum oxide, until the calculated amount of hydrogen has been taken up. The catalyst is filtered off, the filtrate is concentrated by evaporation and the residue is crystallized from isopropanol. 2-methyl - 1,2,3,4,4a,9b - hexahydro - 5H - indeno[1,2 - c] pyridin-5-ol has a M.P. of 143–145°.

(II) A solution of 19 g. of sodium borohydride in 50 cc. of water is added dropwise during the course of 10 minutes while stirring well to a solution of 50.0 g. of 2-methyl - 1,2,3,4,4a,9b - hexahydro - 5H - indeno - [1,2 - c] pyridin-5-one in 50 cc. of ethanol, whereby the temperature rise to about 40°. Stirring is effected for a further hour at 40°, then for 2 hours at reflux, 50 cc. of methanol are then added dropwise and after a further hour cooling is effected. The precipitate is subsequently filtered off and the filtrate evaporated to dryness. The filter residue is combined with the evaporation residue of the filtrate and taken up in water and chloroform. Shaking is effected until the material dissolves completely, the chloroform layer is separated and the aqueous phase is extracted twice more with chloroform. The combined organic phases are dried over magnesium sulphate, concentration is effected and the residue is crystallized several times from isopropanol. The same compound as in section I. is obtained, having a M.P. of 143–145°. The mother liquor yields a further fraction, having a M.P. of about 132–136°, consisting of a mixture of the stereoisomers of the above compound, which may, however, be used directly for the splitting off of water.

(III) A solution of 20.1 g. of 2-methyl-1,2,3,4,4a,9b-hexahydro-5H-indeno[1,2-c]pyridin-5-one in 100 cc. of tetrahydrofuran is added dropwise at 20° to a suspension of 1.9 g. of lithium aluminum hydride in 50 cc. of absolute tetrahydrofuran, the mixture is heated to the boil at reflux for 2 hours, after cooling to 10° 8 cc. of a saturated, aqueous sodium sulphate solution are added dropwise and the precipitate is filtered off; this precipitate is extracted several times with boil tetrahydrofuran. The combined filtrates are concentrated by evaporation and the residue is crystallized from isopropanol. 2-methyl-1,2,3,4, 4a,9b-hexahydro-5H-indeno[1,2-c]pyridin-5-ol has a M.P. of 143–145°.

(IV) A solution of 20 g. of 2-methyl-1,2,3,4,4a,9b-hexahydro-5H-indeno[1,2-c]pyridin-5-one in 150 cc. of ethanol is hydrogenated in a shaking autoclave at room temperature and at a pressure of 51 atmospheres for 18 hours in the presence of 2 cc. of Raney nickel. The catalyst is subsequently filtered off, the filtrate is concentrated by evaporation in a vacuum and the residue is crystallized twice from isopropanol. 2-methyl-1,2,3,4,4a,9b-hexahydro-5H-indeno[1,2-c]pyridin-5-ol has a M.P. of 143–145°.

(V) A solution of 10 g. of 2-ethoxycarbonyl-1,2,3,4, 4a,9b-hexahydro-5H-indeno[1,2-c]pyridin-5-ol in 50 cc. of tetrahydrofuran is added dropwise during the course of 15 minutes while stirring to a suspension of 3 g. of lithium aluminium hydride in 100 cc. of absolute tetrahydrofuran. The mixture is stirred at the boil at reflux for two hours, is then cooled to room temperature and a saturated aqueous sodium sulphate solution is added dropwise, until a precipitate results. Filtration is effected, the filter residue is extracted thrice with boiling tetrahydrofuran and the combined filtrates are concentrated by evaporation in a vacuum. The residue is recrystallized from isopropanol and then from acetone. 2-methyl-1,2,3,4,4a,9b-hexahydro-5H-indeno-[1,2-c]pyridin-5-ol has a M.P. of 143–145°.

The 2-ethoxycarbonyl-1,2,3,4,4a,9b-hexahydro-5H-indeno-[1,2-c]pyridin-5-ol used as starting material for the embodiment V, of the process may, for example, be produced as follows:

13.8 cc. of acetic acid anhydride are added at room temperature to a solution of 20 g. of 2-methyl-1,2,3,4,4a,9b-hexahydro-5H-indeno[1,2-c]pyridin-5-ol in 100 cc. of pyridine and the mixture is allowed to stand for 24 hours. Concentration is effected by evaporation in a vacuum at 40°, the remaining oil is poured into 200 cc. of water and is made alkaline with an aqueous sodium carbonate solution while cooling with ice and stirring well. The resulting precipitate is filtered off after some time, is washed well with water and dried in an exsiccator. After recrysallization from isopropanol 2-methyl-5-acetoxy-1,2,3,4,4a, 9b-hexahydro-5H-indeno[1,2-c]pyridine has a M.P. of 98–100°.

A solution of 40.7 g. of chloroformic acid ethyl ester in 50 cc. of benzene is added dropwise during the course of 30 minutes to a solution of 21.6 g. of the 2-methyl-5-acetoxy-1,2,3,4,4a,9b-hexahydro - 5H - indeno[1,2-c] pyridine obtained above in 200 cc. of absolute benzene, whereby the temperature rises to about 30°. Heating at reflux is subsequently effected for 3 hours, whereby most of the initially resulting precipitate redissolves. Cooling is then effected, shaking is effected first with 150 cc. of water, then twice with 1 N hydrochloric acid, each time with 150 cc., and then twice more with water, each time with 100 cc., the benzene layer is dried over magnesium sulphate and concentrated by evaporation. The crude 2-ethoxycarbonyl - 5 - acetoxy-1,2,3,4,4a,9b-hexahydro-5H-indeno[1,2-c]pyridine which results as a yellow viscous oil, is heated at reflux with a solution of 25 g. of potassium hydroxide in 250 cc. of butanol for 15 minutes. The mixture is cooled, diluted with 400 cc. of ether and shaken out several times with water until the water washing gives a neutral reaction. After drying over magnesium sulphate the organic phase is concentrated by evaporation and the residue distilled in a high vacuum, whereby 2-ethoxycarbonyl-1,2,3,4,4a,9b-hexahydro-5H-indeno[1,2-c]pyridine-5-ol distills at 190–200°/0.1 mm. of Hg. as a slightly yellow coloured viscous oil (temperature taken in the air bath).

EXAMPLE 2

2-methyl-1,3,4,9b-tetrahydro-2H-indeno[1,2-c]pyridine

A solution of 5 g. of 2-methyl-1,2,3,4,4a,9b-hexahydro-5H-indeno[1,2-c]pyridine-5-ol and 15 g. of naphthalene-1,5-disulphonic acid in 50 cc. of water is heated to the boil at reflux for 1½ hours. The reaction mixture is then evaporated to dryness in a vacuum and the residue is crystallized twice from ethanol. Bis-(2-methyl-1,3,4,9b-tetrahydro-2H-indeno[1,2-c]pyridine)-naphthalene - 1,5-disulphonate has a M.P. of 275–280° with decomposition.

EXAMPLE 3

2-benzyl-1,3,4,9b-tetrahydro-2H-indeno[1,2-c]pyridine 10 g. of 2-benzyl-1,2,3,4,4a,9b-hexahydro-5H-indeno-[1,2-c]pyridin-5-ol are heated to the boil at reflux in a mixture of 15 cc. of concentrated hydrochloric acid and 35 cc. of water for 20 minutes. Upon cooling the reaction mixture the hydrochloride of the compound mentioned in the heading crystallizes; it is filtered off and recrystallized first from water and then from ethanol. Upon heating to 165° or above it slowly takes a green colour and has a M.P. of 215–225° (decomposition).

The compound used as starting material is produced as follows:

(a) 4-ethoxycarbonyl-1-benzyl-pyridinium bromide.—226 g. of isonicotinic acid ethyl ester and 390 g. of benzyl bromide in 375 cc. of ethanol are heated to the boil at reflux for 18 hours. Ether is added to the cooled reaction mixture until crystallization commences. After several hours the precipitate is filtered off and thoroughly washed with ether. The compound indicated in the heading is obtained in the form of hygroscopic crystals having a M.P. of 168° with decomposition.

(b) 1-benzyl-1,2,5,6-tetrahydroisonicotinic acid ethyl ester.—40 g. of sodium borohydride are added portionwise at −5° to 0° during the course of 2 hours to a solution of 326 g. of 4-ethoxy-carbonyl-1-benzyl-pyridinium bromide in 1.4 liters of methanol and the mixture is stirred at room temperature for 3½ hours. The methanol is then completely distilled off in a vacuum, the residue is taken up in 1 liter of benzene, the resulting precipitate is filtered off and the filtrate is concentrated by evaporation in a vacuum. The residue is distilled in a high vacuum, whereby 1-benzyl-1,2,5,6-tetrahydroisonicotinic acid ethyl ester distills over at 115–118°/0.03 mm. of Hg.

$n_D^{20} = 1.5337$.

(c) 1-benzyl-3-phenyl-isonipecotinic acid ethyl ester (mixture of isomers).—30.9 g. of magnesium shavings are covered with a layer of 120 cc. of absolute tetrahydrofuran, a spatula tip of iodine and about 30 cc. of a solution of 209 g. bromobenzene in 300 cc. of absolute toluene are added and heating is effected until the reaction commences. The remainder of the above bromobenzene solution is then rapidly added dropwise at such a rate that the solution boils continuously (about 1 hour) and heating at reflux is subsequently effected for a further 2 hours. A solution of 149 g. of 1-benzyl-1,2,5,6-tetrahydroisonicotinic acid ethyl ester in 150 cc. of absolute benzene is then added dropwise at −15° to this phenyl-magnesium bromide solution during the course of 1 hour while stirring well, stirring is then continued for 1 hour at −15° and the reaction mixture is then poured into 2 liters of an ice-cold 20% aqueous ammonium chloride solution while stirring. Filtration is effected through diatomaceous earth, the organic phase is separated and the aqueous phase is extracted twice with ether; the combined organic phases are extracted thrice with a total of 1 liter of 10% aqueous acetic acid. A caustic potash solution is added to the acid aqueous extracts while cooling with ice until an alkaline reaction is obtained and the precipitated bases are taken up in methylene chloride; the organic phase is washed with a saturated aqueous sodium chloride solution, dried over magnesium sulphate and concentrated by evaporation. The residue is triturated with 250 cc. of hexane, whereupon small amounts of 1-benzoyl-4-benzoyl-3-phenylpiperidine crystallize (M.P. 162°).

The precipitate is filtered off, the filtrate is concentrated by evaporation and the residue is distilled in a high vacuum, whereby the compound mentioned in the heading distills over at 170–180°/0.1 mm. of Hg.

(d) 2 - benzyl - 1,2,3,4,4a,9b - hexahydro - 5H - indeno[1,2-c]pyridin - 5 - one.—68 g. of 1-benzyl-3-phenyl-isonipecotinic acid ethyl ester (mixture of isomers) are added at about 100° to 700 g. of polyphosphoric acid, heated is slowly effected to 180° during the course of 1 hour in an atmosphere of nitrogen while stirring well and the mixture is kept at this temperature of a further 3 hours. The dark brown reaction solution is cooled to 100° and poured into 1 liter of water; the solution is made alkaline with a 50% aqueous potassium hydroxide solution (about 1.4 liters) in an atmosphere of nitrogen while cooling well. 1.5 liters of ether are then added, the mixture is stirred thoroughly, filtered over diatomaceous earth, the ether layer is separated and the aqueous phase is again extracted twice with ether. The ether layers are combined, dried over potassium carbonate and concentrated by evaporation; the residue is distilled in a high vacuum, whereby the compound mentioned in the heading distills over at 180–200°/0.03 mm. of Hg as a yellow, viscous oil (temperature taken in the air bath). The compound is readily affected by oxygen and is therefore worked up immediately. The hydrochloride has a M.P. of 210° (decomp.) after crystallization from isopropanol.

(e) 2 - benzyl - 1,2,3,4,4a,9b - hexahedro - 5H - indeno[1,2-c]pyridin-5-ol.—A solution of 29 g. of 2-benzyl-1,2,3,4,4a,9b - hexahydro-5H-indeno[1,2-c]pyridin-5-one in 75 cc. of absolute tetrahydrofuran is added dropwise at 10° to a suspension of 3 g. of lithium aluminum hydride in 25 cc. of absolute tetrahydrofuran. The mixture is heated to the boil at reflux for 1 hour, is cooled to 0° and 13 cc. of a saturated aqueous sodium sulphate solution are added dropwise while cooling well. The precipitate is filtered off and again extracted twice, each time with 100 cc. of boiling tetrahydrofuran. The combined filtrates are concentrated by evaporation and the residue is distilled in a high vacuum, whereby the compound mentioned in the heading distills over at 180–190°/0.02 mm. of Hg as a viscous oil (temperature taken in the air bath). The distillate is dissolved in 50 cc. of ethanol and a solution of 15.1 g. of naphthalene-1,5-disulphonic acid in 50 cc. of ethanol is added. The salt which crystallizes immediately is filtered off after some time and washed with ethanol; the base is again liberated by stirring with a 1 N sodium hydroxide solution and methylene chloride. The base is a colourless viscous resin at room temperature. The hydrogen maleate has a M.P. of 167–169° (decomp.) after crystallization from ethanol.

EXAMPLE 4

1,3,4,9b-tetrahydro-2H-indeno[1,2-c]pyridine 10.0 g. of 1,2,3,4,4a,9b-hexadhydro-5H-indeno[1,2-c]-pyridin-5-ol hydrochloride are heated to the boil at reflux with 40 cc. of 2 N hydrochloric acid for 20 minutes. The reaction mixture is then cooled to 0° and the precipitated hydrochloride of the compound mentioned in the heading is filtered off; it is dried in a vacuum and recrystallized from methanol, M.P. 302–308° (decomp.).

The 1,2,3,4,4a,9b-hexahydro-5H-indeno[1,2-c]pyridin-5-ol used as starting material may be produced by one of the methods described below:

(I) A solution of 36.0 g. of chloroformic acid ethyl ester in 50 cc. of benzene is added dropwise during the course of 20 minutes while stirring well to a solution of 20.0 g. of 2-methyl-1,2,3,4,4a,9b-hexadhydro-5H-indeno-[1,2-c]pyridin-5-one in 200 cc. of absolute benzene. The mixture is heated to the boil at reflux for 3 hours, is then cooled and shaken out, first with 200 cc. of water, then twice, each time with 100 cc. of 1 N hydrochloric acid and then again with water, the organic phase is dried over magnesium sulphate and concentrated by evaporation. The resulting crude, viscous oil is heated to the boil at reflux with 450 cc. of 5 N hydrochloric acid in an atmosphere of nitrogen for 17 hours. Evaporation to dryness is then effected and the residue is crystallized from ethanol. 1,2,3,4,4a,9b-hexahydro-5H-indeno[1,2-c]pyridin-5-one hydrochloride has a M.P. of 235–238° (decomp.)

A solution of 20.0 g. of the 1,2,3,4,4a,9b-hexahydro-5H - indeno[1,2 - c]pyridin-5-one hydrochloride obtained above in 250 cc. of methanol is shaken with 0.4 g. of platinum oxide and hydrogen until hydrogen is no longer taken up. The catalyst is then filtered off, the filtrate is concentrated by evaporation in a vacuum and the residue is crystallized from isopropanol. 1,2,3,4,4a,9b-hexahydro-5H-indeno[1,2-c]pyridin-5-ol hydrochloride has a M.P. of 200–202° (decomp.).

(II) A solution of 4 g. of sodium hydroxide in 10 cc. of water and 4 cc. of Raney nickel is added to a solution of 20 g. of 1,2,3,4,4a,9b - hexahydro - 5H-indeno[1,2-c]-pyridin-5-one hydrochloride (production see I above) in 300 cc. of methanol and shaking is effected with hydrogen at 50° and 21 atmospheres for 18 hours. The catalyst is subsequently filtered off, the filtrate is concentrated by evaporation, the solid residue is triturated with water and filtered. The filter residue is washed well with water, dried and recrystallized from isopropanol. 1,2,3,4,4a,9b-hexahydro-5H-indeno[1,2-c]pyridin-5-ol has a M.P. of 182–184°.

(III) 3.4 cc. of 2 N hydrochloric acid are added to a solution of 2 g. of 2-benzyl-1,2,3,4,4a,9b-hexahydro-5H-indeno[1,2-c]pyridin-5-ol (Example 3(e)) in 30 cc. of ethanol and shaking is then effected in the presence of 200 mg. of a palladium catalyst (10% on charcoal) with hydrogen. After the calculated amount of hydrogen has been taken up, hydrogenation stops. The catalyst is filtered off, the filtrate is concentrated by evaporation, the residue is taken up in water and the solution is made alkaline. Extraction is effected with methylene chloride, the organic phase which has been dried over potassium carbonate is concentrated by evaporation and the residue is crystallized from a small amount of isopropanol. 1,2,3,4,4a,9b - hexahydro-5H-indeno[1,2-c]pyridin-5-ol is obtained in the form of a mixture of isomers having a M.P. of 152–176°, which mixture may be used directly for the splitting off of water.

EXAMPLE 5

7-chloro-2-methyl-1,3,4,9b-tetrahydro-2H-indeno-[1,2-c]pyridine 10 g. of 7-chloro-2-methyl-1,2,3,4,4a,9b-hexahydro-5H-indeno[1,2-c]pyridin-5-ol are heated to the boil at reflux with a mixture of 20 cc. of concentrated hydrochloric acid and 40 cc. of water for 20 minutes. The mixture is then cooled, concentrated by evaporation in a vacuum and the resulting foam is taken up in acetone, whereupon the hydrochloride of the compound mentioned in the heading crystallizes. M.P. 256–258° (decomp.) after crystallization from isopropanol.

The 7 - chloro - 2 - methyl - 1,2,3,4,4a,9b-hexahydro-5H-indeno[1,2-c]pyridin-5-ol used as starting material may be produced as follows:

A solution of 4.7 g. of sodium borohydride in 15 cc. of water is added during the course of 5 minutes to a solution of 14.3 g. of 7-chloro-2-methyl-1,2,3,4,4a,9b-hexahydro-5H-indeno[1,2-c]pyridin-5-one in 150 cc. of ethanol. Stirring is first effected at 35° for 1 hour, then at reflux for 4 hours, 15 cc. of methanol are added and heating is effected at reflux for a further hour. The resulting precipitate is filtered off and the filtrate concentrated by evaporation. The filter residue and the evaporation residue are combined and taken up in water and methylene chloride. The methylene chloride layer is separated, the aqueous phase is shaken out twice with methylene chloride, the combined organic phases are dried over potassium carbonate and the residue obtained after evaporation of the solvent is crystallized twice from isopropanol. 7 - chloro 2 - methyl - 1,2,3,4,4a,9b - hexahydro - 5H-indeno-[1,2-c]pyridin-5-ol has an M.P. of 169–170°.

EXAMPLE 6

2,7-dimethyl-1,3,4,9b-tetrahydro-2H-indeno[1,2-c] pyridine 10 g. of 2,7 - dimethyl-1,2,3,4,4a,9b-hexahydro-5H-indeno[1,2-c]pyridin-5-ol are heated to the boil at reflux with 100 cc. of 2 N hydrochloric acid for 20 minutes. The reaction mixture is then concentrated by evaporation in a vacuum, 25 cc. of ethanol are added and concentration is again effected. The hydrochloride of the compound mentioned in the heading is first recrystallized from ethanol/ether and then from ethanol. Upon heating to 195° or above it slowly takes a green colour and has a M.P. of 250–255° (decomp.).

The starting material is produced as follows:

A solution of 12.7 g. of 2,7-dimethyl-1,2,3,4,4a-9b-hexahydro-5H-indeno[1,2-c]pyridin-5-one in 60 cc. of tetrahydrofuran is added dropwise at 10–20° to a suspension of 1.1 g. of lithium aluminum hydride in 10 cc. of absolute tetrahydrofuran. Heating at reflux is effected for 1 hour and a saturated aqueous sodium sulphate solution is then carefully added dropwise at 20° with cooling until a readily filterable precipitate results; this precipitate is filtered off and extracted twice with boiling tetrayhdrofuran. The combined filtrates are concentrated by evaporation and the residue is crystallized from acetone. 2,7-di-methyl - 1,2,3,4,4a,9b - hexahydro - 5H - indeno[1,2-c] pyridin-5-ol has a M.P. of 148–150°.

EXAMPLE 7

2-n-propyl-1,3,4,9b-tetrahydro-2H-indeno[1,2-c]pyridine 8.0 g. of 2-n-propyl-1,2,3,4,4a,9b-hexahydro-5H-indeno[1,2-c]pyridin-5-ol are heated to the boil at reflux with 80 cc. of 2 N hydrochloric acid for 20 minutes. Upon cooling the mixture the hydrochloride of the compound mentioned in the heading crystallizes; it is filtered off and recrystallized from 2 N hydrochloric acid. M.P. 261–264° (decomp.).

The starting material may be produced as follows:

15 g. of anhydrous sodium carbonate and 8.7 g. of n-propyl bromide are added to a solution of 12 g. of 1,2,3,4,4a,9b - hexahydro-5H-indeno[1,2-c]pyridin-5-ol in 250 cc. of chloroform and the mixture is heated at reflux for 18 hours. After cooling the mixture is washed with water until neutral, is extracted thrice with 10% aqueous acetic acid, the extracts are made alkaline by the addition of sodium hydroxide and shaking out is effected thrice with ether. The organic phases are combined, dried over sodium sulphate and concentrated by evaporation. 2-n-propyl - 1,2,3,4,4a,9b - hexahydro - 5H - indeno[1,2-c] pyridin-5-ol is obtained as residue and recrystallized from hexane. M.P. 82–84°.

EXAMPLE 8

2-allyl-1,3,4,9b-tetrahydro-2H-indeno[1,2-c]pyridine 10 g. of 2-allyl-1,2,3,4,4a,9b-hexahydro-5H-indeno [1,2-c]pyridin-5-ol are heated to the boil at reflux with 100 cc. of 2 N hydrochloric acid for 20 minutes. Upon cooling the mixture the precipitated hydrochloride of the compound mentioned in the heading is filtered off and recrystallized from 2 N hydrochloric acid. M.P. 260–265° (decomp.).

The starting material is produced as follows:

10 g. of anhydrous sodium carbonate and 5.8 g. of allyl bromide are added to a solution of 8 g. of 1,2,3,4,4a, 9b-hexahydro-5H-indeno[1,2-c]pyridin-5-ol in 200 cc. of chloroform and heating to the boil at reflux is effected for 18 hours. After cooling the mixture is washed with water until neutral, is extracted thrice with 10% aqueous acetic acid, the extracts are made alkaline with sodium hydroxide while cooling and shaking out is effected thrice with ether. The organic phases are combined, dried over magnesium sulphate and concentrated by evaporation. The 2 - allyl - 1,2,3,4,4a,9b - hexahydro - 5H - indeno [1,2-c] pyridin-5-ol obtained as residue is recrystallized from hexane. M.P. 77–78°.

EXAMPLE 9

2-(2-phenylethyl)-1,3,4,9b-tetrahydro-2H-indeno[1,2-c] pyridine 10 g. of 2-(2-phenylethyl)-1,2,3,4,4a,9b-hexahydro-5H-indeno[1,2-c]pyridin-5-ol are heated to the boil at reflux with a mixture of 30 cc. of concentrated hydrochloric acid and 70 cc. of water for 20 minutes. After cooling the mixture the hydrochloride of the compound mentioned in the heading which already precipitates upon heating, is filtered off and recrystallized from methanol. M.P. 240–242° (decomp.).

The starting material is produced as follows:

20 g. of 1,2,3,4,4a,9b-hexahydro-5H-indeno[1,2-c] pyridin-5-ol, 600 cc. of xylene, 25 g. of anhydrous sodium carbonate and 20 g. of 2-phenylethyl bromide are heated to the boil at reflux for 20 hours. The cooled reaction mixture is subsequently shaken out thrice with water, the organic phase is extracted thrice with 10% aqueous acetic acid, the extracts are made alkaline by the addition of sodium hydroxide while cooling and shaking out is effected thrice with ether. The ether layers are combined, dried over sodium sulphate and concentrated by evaporation. The 2-phenylethyl-1,2,3,4,4a,9b-hexahydro-5H-indeno[1,2-c]pyridin-5-ol obtained as residue is recrystallized from acetone. M.P. 112–114°.

EXAMPLE 10

7-bromo-2-methyl-1,3,4,9b-tetrahydro-2H-indeno[1,2-c] pyridine 4.8 g. of 7-bromo-2-methyl-1,2,3,4,4a,9b-hexahydro-5H-indeno[1,2-c]pyridin-5-ol are heated to the boil at reflux with a mixture of 14 cc. of concentrated hydrochloric acid and 28 cc. of water for 50 minutes. The mixture is then cooled, concentrated by evaporation in a vacuum and the residue is taken up in ethanol, whereby the hydrochloride of the compound mentioned in the heading crystallizes. M.P. 251–255° (decomp.).

The 7 - bromo-2-methyl-1,2,3,4,4a,9b-hexahydro-5H-indeno[1,2-c]pyridin-5-ol used as starting material may be produced as follows:

(a) 1 - methyl - 3 - (4 - bromophenyl - isonipecotinic acid methyl ester (mixture of isomers).—14.0 of magnesium shavings are covered with a layer of 50 cc. of absolute ether, 0.2 g. of iodine and then 30.0 g. of p-dibromobenzene are added, whereby a vigorous reaction commences. A solution of 88.0 g. of p-dibromobenzene in 200 cc. of absolute ether is then added dropwise while stirring at such a rate that the mixture boils continuously. After stirring at the boil at reflux for 2 hours cooling is effected and a solution of 35.6 g. of 1-methyl-1,2,5,6-tetrahydro-isonicotinic acid methyl ester in 45 cc. of absolute toluene is added dropwise at −15° during the course of 2 hours. The reaction mixture is stirred at −15° for a further hour and subsequently poured into a solution of 150 g. of ammonium chloride in 600 cc. of water. Shaking out is effected several times with ether, the organic phase is extracted with 1 N hydrochloric acid and the aqueous acid solution is made strongly alkaline with concentrated sodium hydroxide. Extraction is subsequently effected with methylene chloride and the organic extracts which have been washed with water are dried over magnesium sulphate. After evaporating the solvent the residue is distilled in a high vacuum, whereby 1-methyl-3-(4-bromophenyl)-isonipecotinic acid methyl ester (mixture of isomers) distills over at 146–148°/0.06 mm. of Hg.

(b) 7 - bromo - 2 - methyl - 1,2,3,4,4a,9b - hexahydro-5H-indeno[1,2-c]pyridin-5-one.—A mixture of 55.0 g. of 1 - methyl - 3 - (4 - bromophenyl) - isonipecotinic acid methyl ester and 550 g. of polyphosphoric acid is heated at 180° for 4 hours, is cooled to about 90° and then poured into 1.5 liters of water while stirring vigorously. A 40% sodium hydroxide solution is slowly added to the resulting turbid solution at a temperature of 10–20° until a weakly alkaline reaction is obtained (pH=8), the precipitated oil is extracted several times with methylene chloride, the combined organic extracts are dried over potassium carbonate and the solvent is completely evaporated. The residue is distilled in a high vacuum, whereby 7-bromo - 2 - methyl - 1,2,3,4,4a,9b - hexahydro - 5H - indeno[1,2-c]pyridin-5-one distills over at 170–185°/0.1 mm. of Hg.

(c) 7 - bromo - 2 - methyl - 1,2,3,4,4a,9b - hexahydro-5H-indeno[1,2-c]pyridin-5-ol.—A solution of 5.45 g. of sodium borohydride in a mixture of 0.5 cc. of 40% sodium hydroxide and 12 cc. of water is added dropwise during the course of 10 minutes while stirring well to a solution of 20.0 g. of 7 - bromo - 2 - methyl - 1,2,3,4,4a,9b - hexahydro - 5H - indeno[1,2-c]pyridin - 5 - one in 20 cc. of ethanol, whereby the temperature should not rise above 40°. Stirring is effected at 40° for a further hour, then at reflux for 2 hours, 15 cc. of methanol are subsequently added dropwise and after a further hour cooling is effected. The precipitate is subsequently filtered off and the filtrate evaporated to dryness. The filter residue is combined with the evaporation residue of the filtrate and taken up in water and chloroform. Shaking is effected until all the material dissolves, the organic phase is separated and the aqueous phase is again extracted twice with chloroform. The combined organic phases are dried over magnesium sulphate, concentrated by evaporation and the residue is crystallized several times from isopropanol. The compound mentioned in the heading has a M.P. of 165–167°. The mother liquor yields a greater fraction, having a M.P. of about 142–151°, consisting of a mixture of stereoisomers, which may be used directly for the splitting off of water.

EXAMPLE 11

2-ethyl-1,3,4,9b-tetrahydro-2H-indeno[1,2-c]pyridine 10 g. of 2 - ethyl - 1,2,3,4,4a,9b - hexahydro - 5H - indeno[1,2-c]pyridin-5-ol are heated to the boil at reflux with 100 cc. of 2 N hydrochloric acid for 20 minutes. The hydrochloride of the compound mentioned in the heading which results upon cooling the reaction mixture, is filtered off and recrystallized from 2 N hydrochloric acid. M.P. 273° (decomp.).

The starting material may be produced by one of the methods described below:

(I) 10 g. of anhydrous sodium carbonate and 7.25 g. of ethyl iodide are added to a solution of 8 g. of 1,2,3,4, 4a,9b - hexahydro - 5H - indeno[1,2-c]pyridin - 5 - ol in 200 cc. of chloroform and heating to the boil at reflux is effected for 18 hours. The cooled reaction mixture is subsequently washed with water until neutral, is extracted thrice with 10% aqueous acetic acid, the acid aqueous extracts are made alkaline with sodium hydroxide and shaking out is effected thrice with ether. The ether phases are combined, dried over sodium sulphate and concentrated by evaporation, whereby 2-ethyl-1,2,3,4,4a,9b-hexahydro-5H-indeno[1,2-c]pyridin-5-ol is obtained as residue. M.P. 102–104° after crystallization from acetone.

(II) 1.9 cc. of acetic anhydride are added dropwise while cooling with ice to a solution of 3.8 g. of 1,2,3,4, 4a,9b - hexahydro - 5H - indeno[1,2-c]pyridin - 5 - ol in 30 cc. of pyridine and the mixture is allowed to stand at room temperature for 12 hours. Concentration is subsequently effected by evaporating in a vacuum, the residue is taken up in water, the solution is acidified with dilute hydrochloric acid and extraction is effected several times with methylene chloride. The organic phases are combined, dried over magnesium sulphate and concentrated by evaporation. The 2 - acetyl - 1,2,3,4,4a,9b - hexahydro - 5H - indeno[1,2-c]pyridin-5-ol obtained as residue is recrystallized from isopropanol and has a M.P. of 156–158°.

4.6 g. of the 2 - acetyl - 1,2,3,4,4a,9b - hexahydro - 5H-indeno[1,2-c]pyridin-5-ol obtained above are added portionwise at about 20° to a suspension of 1 g. of lithium aluminium hydride in 20 cc. of absolute tetrahydrofuran and the mixture is heated to the boil at reflux for 3 hours. Cooling is effected to 20° and a saturated aqueous sodium sulphate solution is slowly added dropwise until a precipitate results (about 7 cc.). The precipitate is filtered off and extracted several times with boiling tetrahydrofuran. The combined filtrates are concentrated by evaporation and the residue is distilled in a high vacuum, whereby an oil having a B.P. of 140–150° (temperature taken in the air bath) distills over at 0.05 mm. of Hg. The distillate is taken up in a small amount of acetone, small amounts of 1,2,3,4,4a,9b - hexahydro - 5H - indeno[1,2-c]pyridin - 5-ol are filtered off and after the addition of ethanol the filtrate is acidified with a solution of hydrogen chloride in ether. The hydrochloride of 2-ethyl-1,2,3,4,4a,9b-hexahydro - 5H - indeno[1,2-c]pyridin - 5 - ol which precipitates immediately is filtered off and recrystallized from ethanol. Upon heating above 200° it takes a green colour and has a M.P. of about 222° (decomp.).

EXAMPLE 12

2-isopropyl-1,3,4,9b-tetrahydro-2H-indeno[1,2-c]pyridine 10 g. of 2 - isopropyl - 1,2,3,4,4a,9b - hexahydro - 5H-indeno[1,2-c]pyridin-5-ol are heated to the boil at reflux in 100 cc. of 2 N hydrochloric acid for 20 minutes. The hydrochloride of the compound indicated in the heading which precipitates upon cooling the reaction mixture is filtered off and recrystallized from 2 N hydrochloric acid. M.P. 260–265° (decomp.).

The starting material may be produced as follows:

10 g. of anhydrous sodium carbonate and 8 g. of isopropyl iodide are added to a solution of 8 g. of 1,2,3,4,4a,9b-hexahydro-5H-indeno[1,2-c]pyridin-5-ol in 200 cc. of chloroform and heating to the boil at reflux is effected for 18 hours. The cooled reaction mixture is subsequently washed with water until neutral, extraction is effected thrice with 10% aqueous acetic acid, the acid aqueous extracts are made alkaline with sodium hydroxide and shaking out is effected thrice with ether. The ether phases are combined, dried over sodium sulphate and concentrated by evaporation, whereby 2-isopropyl-1,2,3,4,4a,9b-hexahydro-5H-indeno[1,2-c]pyridin-5-ol is obtained as residue. M.P. 102–104° after crystallization from acetone.

EXAMPLE 13

2-(2-propinyl)1,3,4,9b-tetrahydro-2H-indeno[1,2-c] pyridine 10 g. of 2-(2-propinyl)-1,2,3,4,4a,9b-hexahydro-5H-indeno[1,2-c]pyridin-5-ol are heated to the boil at reflux in 100 cc. of 2 N hydrochloric acid for 20 minutes. The hydrochloride of the compound mentioned in the heading, which precipitates upon cooling the reaction mixture, is filtered off and recrystallized from water. M.P. 235–238° (decomp.).

The starting material may be produced as follows:

10 g. of anhydrous sodium carbonate and 5.55 g. of 2-propinyl bromide are added to a solution of 8 g. of 1,2,3,4,4a,9b - hexahydro-5H-indeno[1,2-c]pyridin-5-ol in 200 cc. of chloroform and heating to the boil at reflux is effected for 18 hours. The cooled reaction mixture is subsequently washed with water until neutral, extracted thrice with 10% aqueous acetic acid, the acid aqueous extracts are made alkaline with sodium hydroxide and shaking out is effected thrice with ether. The ether phases are combined, dried over sodium sulphate and concentrated by evaporation, whereby 2-(2-propinyl)-1,2,3,4,4a, 9b-hexahydro-5H-indeno[1,2-c]pyridin-5-ol is obtained as residue. M.P. 148–150° after crystallization from acetone.

EXAMPLE 14

(a) (+)-2-methyl-1,3,4,9b-tetrahydro-2H-indeno[1,2-c] pyridine hydrochloride 10 g. of (−)-2-methyl-1,2,3,4,4a,9b-hexahydro-5H-indeno[1,2-c]pyridin-5-ol (M.P. 135–135° from acetone; $[\alpha]_{436}^{20.4}=-98.5°$ [c.=1, methanol]) are heated to the boil at reflux in 50 cc. of 3 N hydrochloric acid for 15 minutes. The reaction mixture is then cooled to 0°, the resulting precipitate is filtered off, recrystallized from 15 cc. of 2 N hydrochloric acid and dried in a vacuum at 80°. (+)-2-methyl-1,3,4,9b-tetrahydro-2H-indeno[1,2-c] pyridine hydrochloride has a M.P. of 250–255° (decomp.). $[\alpha]_{436}^{20.4}=+253°$ (c.=1.0, methanol).

(b) (−)-2-methyl-1,3,4,9b-tetrahydro-2H-indeno[1,2-c] pyridine hydrochloride

The process is effected as above, except that (+)-2-methyl - 1,2,3,4,4a,9b - hexahydro - 5H - indeno[1,2 - c] pyridin-5-ol (M.P. 135–136° from acetone;

$$[\alpha]_{436}^{20.4}=+97°$$

[c.=1.0, methanol]) is used as starting material. The resulting (−) - 2 - methyl - 1,3,4,9b-tetrahydro-2H-indeno [1,2-c]pyridine hydrochloride has a M.P. of 250–255° (decomp.), $[\alpha]_{436}^{20.4}=-253°$ (c.=1.0, methanol).

The optically active starting materials may be produced as follows:

A solution of 76 g. of di-p-tolyl-d-tartaric acid monohydrate in 200 cc. of ethanol is added to a solution of 40 g. of 2-methyl-1,2,3,4,4a,9b-hexahydro-5H-indeno [1,2-c]pyridin-5-ol (racemate having a M.P. of 143–145°, production see Example 1) in 100 cc. of hot ethanol. The resulting solution is cooled and allowed to stand at 0° for 30 minutes. The resulting precipitate is filtered off and recrystallized from approximately 1 liter of 95% ethanol. The resulting di-p-tolyl-d-tartrate crystallizes with one mol of ethanol of crystallization and has a M.P. of 144–145° (decomp.); $[\alpha]_{436}^{20.4}=-247°$ (c.=1.0, methanol). The salt obtained above is shaken with 250 cc. of a 10% aqueous sodium carbonate solution and ether until the material dissolves completely. The organic phase is then separated, the aqueous phase is shaken out twice with ether, the combined ether layers are dried over sodium sulphate, concentrated by evaporation and the residue is crystallized from acetone. (−)-2-methyl-1,2,3, 4,4a,9b-hexahydro-5H-indeno[1,2-c]pyridin-5-ol, having a M.P. of 135–136°, $[\alpha]_{436}^{20.4}=-98.5°$ (c.=1.0, methanol), is obtained.

The corresponding (+)-antipode is produced by concentrating the initially obtained ethanol mother liquor by evaporation in a vacuum. The residue is shaken with 250 cc. of a 10% aqueous sodium carbonate solution and ether until the material dissolves completely. The organic phase is subsequently separated, the aqueous phase is again shaken out twice with ether, the combined ether layers are dried over sodium sulphate and concentrated by evaporation. The crude base obtained as residue $$([\alpha]_{436}^{20}\sim+70°)$$

is dissolved in 50 cc. of ethanol and a solution of 31 g. of di-p-tolyl-1-tartaric acid monohydrate in 100 cc. of ethanol is added, whereupon a precipitate results after a short time. The mixture is cooled in an ice bath during 30 minutes, is filtered and the filter residue is crystallized from 500 cc. of 95% ethanol. The resulting di-p-tolyl-1-tartrate crystallizes with 1 mol of ethanol of crystallization and has a M.P. of 144–145° (decomp.). $[\alpha]_{436}^{20.4}=+248°$ (c.=1.0, methanol).

The free base is obtained from this salt in a manner analogous to that described above for the di-p-tolyl-d- tartrate, (+)-2 - methyl - 1,2,3,4,4a9b - hexahydro - 5H-indeno[1,2-c]pyridin-5-ol has a M.P. of 135–136°. $[\alpha]_{436}^{20.4}+=97°$ (c.=1.0, methanol).

EXAMPLE 15

2-(2-butinyl)-1,3,4,9b-tetrahydro-2H-indeno[1,2-c]pyridine 10 g. of 2-(2-butinyl) - 1,2,3,4,4a,9b - hexahydro-5H-indeno[1,2-c]pyridin-5-ol are heated to the boil under reflux in 100 cc. of 2 N hydrochloric acid for 20 minutes. The reaction mixture is then allowed to cool and filtered. The residue is recrystallized from 2 N hydrochloric acid. The resulting hydrochloride of the compound indicated in the heading has a melting point of 210 to 215° (decomp.).

The 2-(2-butinyl)-1,2,3,4,4a,9b - hexahydro-5H-indeno[1,2-c]pyridin-5-ol used as starting material is produced as follows:

37 g. of anhydrous sodium carbonate and 24 g. of 1-chloro-2-butine are added to a solution of 30 g. of 1,2,3,4,4a,9b-hexahydro-5H-indeno[1,2-c]pyridin-5-ol in 750 cc. of chloroform and the mixture is heated to the boil under reflux for 3 hours. The mixture is subsequently allowed to cool, the chloroform layer is washed with water until neutral, is then dried over sodium sulphate and concentrated by evaporation. The residue is recrystallized twice from isopropanol. The resulting 2-(2-butinyl) - 1,2,3,4,4a,9b - hexahydro-5H-indeno[1,2-c]pyridin-5-ol has a melting point of 170°.

EXAMPLE 16

2-(2-methylallyl)-1,3,4,9b-tetrahydro-2H-indeno[1,2-c]pyridine

This compound is obtained in a manner analogous to that described in Example 15, except that 2-(2-methylallyl) - 1,2,3,4,4a,9b - hexahydro - 5H - indeno[1,2-c]pyridin-5-ol is used as starting material. The resulting hydrochloride of the compound indicated in the heading has a melting point of about 210° (decomp.).

The 2-(2-methylallyl) - 1,2,3,4,4a,9b - hexahydro-5H-indeno[1,2-c]pyridin-5-ol used as starting material is produced as follows:

12 g. of 1,2,3,4,4a,9b-hexahydro-5H-indeno[1,2-c]pyridin-5-ol, 5.75 g. of methallyl chloride, 15 g. of sodium carbonate and 250 cc. of chloroform are heated to the boil under reflux for 17 hours. The mixture is allowed to cool and the chloroform layer is washed with water until neutral, is then dried over magnesium sulphate and concentrated by evaporation. The residue is dissolved in acetone and filtered over 50 g. of silica gel. Elution is subsequently effected with acetone and the eluate is concentrated by evaporation. The crude 2-(2-methylallyl)-1,2,3,4,4a,9b-hexahydro-5H-indeno[1,2-c]pyridin-5-ol obtained as an almost colourless resin, is further used as such. Its neutral naphthalene-1,5-disulphonate has a melting point of 228 to 230° (decomp.).

EXAMPLE 17

2-(trans-2-butenyl)-1,3,4,9b-tetrahydro-2H-indeno[1,2-c]pyridine

This compound is obtained in a manner analogous to that indicated in Example 15, except that 2-(trans-2-butenyl) - 1,2,3,4,4a,9b - hexahydro - 5H - indeno[1,2-c]pyridin-5-ol is used as starting material. The resulting hydrochloride of the compound indicated in the heading has a melting point of 225 to 227° (decomp.).

The 2-(trans - 2 - butenyl-1,2,3,4,4a,9b-hexahydro-5H-indeno[1,2-c]pyridin-5-ol used as starting material is produced as follows:

This compound is obtained in a manner analogous to that described in Example 15, except that 12 g. of 1,2,3,4,4a,9b-hexahydro-5H-indeno[1,2-c]pyridin-5-ol are used as starting material and this is reacted with 6.3 g. of trans-crotyl chloride. The resulting product is recrystallized from acetone/pentane and has a melting point of 110 to 112°.

EXAMPLE 18

2-(3-butinyl)-1,3,4,9b-tetrahydro-2H-indeno[1,2-c]pyridine 10 g. of 2-(3-butinyl) - 1,2,3,4,4a,9b - hexahydro-5H-indeno[1,2-c]pyridin-5-ol are heated to the boil under reflux in 200 cc. of 2 N hydrochloric acid for 20 minutes. The mixture is subsequently allowed to cool and is filtered. The residue is recrystallized from 2 N hydrochloric acid. The resulting hydrochloride of the compound indicated in the heading has a melting point of 235 to 237° (decomp.).

The 2-(3-butinyl) - 1,2,3,4,4a,9b - hexahydro - 5H - indeno[1,2-c]pyridin-5-ol used as starting material is produced as follows:

18 g. of anhydrous sodium carbonate and 12.7 g. of 1-bromo-3-butine are added to a solution of 15 g. of 1,2,3,4,4a,9b-hexahydro - 5H - indeno[1,2-c]pyridin-5-ol in 360 cc. of chloroform and the mixture is heated to the boil under reflux for 3 hours. The reaction mixture is subsequently allowed to cool, the chloroform layer is washed with water until neutral, is dried over sodium sulphate and concentrated by evaporation. The residue is dissolved in acetone and is filtered over 100 g. of silica gel. The filtrate is concentrated, whereupon 2-(3-butinyl)-1,2,3,4,4a,9b - hexahydro-5H-indeno[1,2-c]pyridin-5-ol crystallizes. This is again recrystallized from acetone and then has a melting point of 135 to 136°.

The same final product, i.e. 2-(3-butinyl)-1,2,3,4,4a,9b-hexahydro - 5H - indeno[1,2-c]pyridin-5-ol, may likewise be obtained without altering the conditions of the process, by using 15 g. of 1-methyl-sulphonyloxy-3-butine in place of 12.7 g. of 1-bromo-3-butine.

EXAMPLE 19

2-(3,3-dimethylallyl)-1,3,4,9b-tetrahydro-2H-indeno[1,2-c]pyridine 5.7 cc. of thionyl chloride are added to a solution of 10 g. of 2-(3,3-dimethylallyl) - 1,2,3,4,4a,9b - hexahydro-5H-indeno[1,2-c]pyridin-5-ol in 100 cc. of chloroform and the mixture is heated to the boil under reflux for 30 minutes. The mixture is then completely concentrated by evaporation. The residue is subsequently heated to about 75° with 20 cc. of water for 10 minutes. Cooling is then effected, the resulting product is filtered off and recrystallized from ethanol. The hydrochloride of the compound indicated in the heading has a melting point of 230 to 236° (decomp.).

The 2-(3,3 - dimethylallyl)-1,2,3,4,4a,9b-hexahydro-5H-indeno[1,2-c]pyridin-5-ol used as starting material is produced as follows:

This compound is obtained in a manner analogous to that described in Example 15, except that 12 g. of 1,2,3,4,4a,9b-hexahydro-5H-indeno[1,2-c]pyridin-5-ol are used as starting material and this is reacted with 7.3 g. of 3,3-dimethylallyl chloride. The resulting product is recrystallized from acetone and has a melting point of 121 to 123°.

EXAMPLE 20

(−)-7-chloro-2-methyl-1,3,4,9b-tetrahydro-2H-indeno[1,2-c]pyridine hydrochloride This compound is obtained in a manner analogous to that described in Example 19, except that (+)-7-chloro-2-methyl-1,2,3,4,4a,9b - hexahydro - 5H - ideno[1,2-c]pyridin-5-ol (M.P. 158–160°, from acetone; $[\alpha]_{436}^{20}=+144.9°$ [c.=1.0; methanol]) is used as starting material. The hydrochloride of the title compound has a M.P. of 255–260° (decomp.); $[\alpha]_{436}^{20}=-173.0°$ (c.=1.0; methanol).

The (+)-7-chloro - 2 - methyl-1,2,3,4,4a,9b-hexahydro-5H-indeno[1,2-c]pyridin-5-ol, used as starting material, is produced as follows:

22.6 g. of 7-chloro-2-methyl-1,2,3,4,4a,9b-hexahydro-5H-indeno[1,2-c]pyridin-5-ol and 23.8 g. of (+)-camphor-10-sulphonic acid monohydrate are dissolved in 120 cc. of absolute ethanol. The salt which crystallizes upon standing of 0° is filtered off and recrystallized from 50 cc. of absolute ethanol. The resulting camphor sulphonate has a melting point of 205 to 207° (decomp.); $[\alpha]_{436}^{20} = +108.0°$ (c.=1.0; methanol).

17 g. of this camphor sulphonate are shaken with 300 cc. of a 10% soda solution and 500 cc. of methylene chloride until all the material is dissolved. The organic phase is separated, extraction is again effected twice with methylene chloride, the combined extracts are dried over magnesium sulphate and concentrated by evaporation. The residue is recrystallized from acetone, whereby (+)-7-chloro-2-methyl-1,2,3,4,4a,9b - hexahydro - 5H-indeno[1,2-c]pyridin-5-ol, having a melting point of 158 to 160° is obtained. $[\alpha]_{436}^{20} = +144.9°$ (c.=1.0; methanol).

EXAMPLE 21

(+)-7-chloro-2-methyl-1,3,4,9b-tetrahydro-2H-indeno[1,2-c]pyridine hydrochloride This compound is obtained in a manner analogous to that described in Example 19, except that (—)-7-chloro - 2 - methyl - 1,2,3,4,4a,9b - hexahydro - 5H - indeno[1,2-c]pyridin-5-ol (M.P. 158–160°, from acetone; $[\alpha]_{436}^{20} = +144.9°$ [c.=1.0; methanol]) is used as starting material. The hydrochloride of the title compound has a M.P. of 255–260° (decomp.); $[\alpha]_{436}^{20} = +173.0°$ (c.=1.0; methanol).

The (—)-7-chloro-2-methyl-1,2,3,4,4a,9b - hexahydro-5H-indeno[1,2-c]pyridin-5-ol, used as starting material, is produced as follows:

The camphor sulphonate monohydrate of the other antipode may be obtained from the ethanolic mother liquor resulting during the production of (+)-7-chloro-2-methyl-1,2,3,4,4a,9b - hexahydro - 5H - indeno[1,2-c]pyridin-5-ol by fractional crystallization from isopropanol. M.P. 159–161°; $[\alpha]_{426}^{20} = 7.5°$ (c.=1.0; methanol).

The resulting camphor sulphonate is further worked up in a manner analogous to that described above for the first antipode, whereby (—)-7-chloro-2-methyl-1,2,3,4,4a,9b-hexahydro-5-H-indeno[1,2-c]pyridin-5-ol, havin a M.P. of 158–160°, $[\alpha]_{436}^{20} = 144.9°$ (c.=1.0; methanol), is obtained.

EXAMPLE 22

Galenical preparation: Tablets

| | G. |
|---|---|
| 2-methyl-1,3,4,9b-tetrahydro-2H - indeno[1,2-c]pyridine hydrochloride (compound of Example 1) | [1] 0.0239 |
| Magnesium stearate | 0.0010 |
| Polyvinyl pyrrolidone | 0.0040 |
| Talcum | 0.0080 |
| Maize starch | 0.010 |
| Lactose | 0.1096 |
| Dimethyl-silicone oil | 0.0005 |
| Polyethylene glycol 6000 | 0.0030 |
| | 0.160 |

[1] Corresponds to 20 mg. of the free base.

What is claimed is:

1. A compound selected from the group consisting of an acid addition salt of a compound of formula:

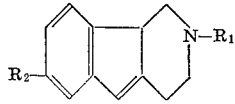

wherein $R_1$ is hydrogen, lower alkyl, lower alkenyl or lower alkinyl, benzyl or phenylethyl, and $R_2$ is hydrogen, chlorine or bromine or lower alkyl.

2. A compound according to claim 1, in which the compound is an acid addition salt of 2-methyl-1,3,4,9b-tetrahydro-2H-indeno[1,2-c]pyridine.

3. A compound according to claim 1, in which the compound is an acid addition salt of 2-benzyl-1,3,4,9b-tetrahydro-2H-indeno[1,2-c]pyridine.

4. A compound according to claim 1, in which the compound is an acid addition salt of 1,3,4,9b-tetrahydro-2H-indeno[1,2-c]pyridine.

5. A compound according to claim 1, in which the compound is an acid addition salt of 7-chloro-2-methyl-1,3,4,9b-tetrahydro-2H - indeno[1,2-c]pyridine.

6. A compound according to claim 1, in which the compound is an acid addition salt of 2,7-dimethyl-1,3,4,9b-tetrahydro-2H-indeno[1,2-c]pyridine.

7. A compound according to claim 1, in which the compound is an acid addition salt of 2-n-propyl-1,3,4,9b-tetrahydro-2H-indeno[1,2-c]pyridine.

8. A compound according to claim 1, in which the compound is an acid addition salt of 2-allyl-1,3,4,9b-tetrahydro-2H-indeno[1,2-c]pyridine.

9. A compound according to claim 1, in which the compound is an acid addition salt of 2-(2-phenylethyl)-1,3,4,9b-tetrahydro-2H-indeno[1,2-c]pyridine.

10. A compound according to claim 1, in which the compound is an acid addition salt of 7-bromo-2-methyl-1,3,4,9b-tetrahydro-2H-indeno[1,2-c]pyridine.

11. A compound according to claim 1, in which the compound is an acid addition salt of 2-ethyl-1,3,4,9b-tetrahydro-2H-indeno[1,2-c]pyridine.

12. A compound according to claim 1, in which the compound is an acid addition salt of 2-isopropyl-1,3,4,9b-tetrahydro-2H-indeno[1,2-c]pyridine.

13. A compound according to claim 1, in which the compound is an acid addition salt of 2 - (2 - propinyl)-1,3,4,9b-tetrahydro-2H-indeno[1,2-c]pyridine.

14. A compound according to claim 1, in which the compound is an acid addition salt of (+)-2-methyl-1,3,4,9b-tetrahydro-2H-indeno[1,2-c]pyridine.

15. A compound according to claim 1, in which the compound is an acid addition salt of (—)-2-methyl-1,3,4,9b-tetrahydro-2H-indeno[1,2-c]pyridine.

16. A compound according to claim 1, in which the compound is an acid addition salt of 2-(2-butinyl)-1,3,4,9b-tetrahydro-2H-indeno[1,2-c]pyridine.

17. A compound according to claim 1, in which the compound is an acid addition salt of 2-(2-methylallyl)-1,3,4,9b-tetrahydro-2H-indeno[1,2-c]pyridine.

18. A compound according to claim 1, in which the compound is an acid addition salt of 2-trans-2-butenyl)-1,3,4,9b-tetrahydro-2H-indeno[1,2-c]pyridine.

19. A compound according to claim 1, in which the compound is an acid addition salt of 2-(3-butinyl)-1,3,4,9b-tetrahydro-2H-indeno[1,2-c]pyridine.

20. A compound according to claim 1, in which the compound is an acid addition salt of 2-(3,3-dimethylallyl)-1,3,4,9b-tetrahydro-2H-indeno[1,2-c]pyridine.

21. A compound according to claim 1, in which the compound is an acid addition salt of (—)-7-chloro-2-methyl-1,3,4,9b-tetrahydro-2H-indeno[1,2-c]pyridine.

22. A compound according to claim 1, in which the compound is an acid addition salt of (+)-7-chloro-2-methyl-1,3,4,9b-tetrahydro-2H-indeno[1,2-c]pyridine.

23. A compound selected from the group consisting of a compound of formula:

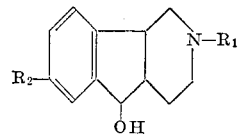

wherein $R_1$ is hydrogen, lower alkyl, lower alkenyl or lower alkinyl, benzyl or phenylethyl, and $R_2$ is hydrogen, chlorine or bromine or lower alkyl.

References Cited

UNITED STATES PATENTS 3,408,353  10/1968  Jucker et al. _____ 260—293

HENRY R. JILES, Primary Examiner

G. T. TODD, Assistant Examiner

U.S. Cl. X.R.

260—294.3, 294.7, 295; 424—267